United States Patent [19]

Ohba et al.

[11] Patent Number: 5,802,036
[45] Date of Patent: Sep. 1, 1998

[54] OPTICAL HEAD DEVICE UTILIZING SUPER-RESOLUTION TECHNIQUE

[75] Inventors: Akitomo Ohba; Masahiko Sato; Jun-ichi Takahashi, all of Tokyo, Japan

[73] Assignee: NEC Corporation, Tokyo, Japan

[21] Appl. No.: 916,013

[22] Filed: Aug. 21, 1997

Related U.S. Application Data

[63] Continuation of Ser. No. 559,290, Nov. 15, 1995, Pat. No. 5,724,334.

[30] Foreign Application Priority Data

| Nov. 15, 1994 | [JP] | Japan | 6-280206 |
| Nov. 15, 1994 | [JP] | Japan | 6-280207 |
| Dec. 12, 1994 | [JP] | Japan | 6-332049 |

[51] Int. Cl.$^6$ ..................................................... G11B 7/00
[52] U.S. Cl. ....................................... 369/112; 369/44.23
[58] Field of Search ........................... 369/112, 44.23, 369/44.24, 118, 44.12, 107; 359/245

[56] References Cited

U.S. PATENT DOCUMENTS

| 4,010,317 | 3/1977 | Bouwhuis | 358/127 |
| 4,034,403 | 7/1977 | Compaan et al. | 358/128 |
| 5,153,873 | 10/1992 | Spruit et al. | 369/118 |
| 5,172,366 | 12/1992 | Chikuma | 369/120 |
| 5,303,224 | 4/1994 | Chikuma et al. | 369/275.1 |
| 5,349,592 | 9/1994 | Ando | 369/112 |
| 5,365,052 | 11/1994 | Yanagisawa et al. | 369/100 |
| 5,446,565 | 8/1995 | Komma et al. | 369/112 |
| 5,450,376 | 9/1995 | Matsumura et al. | 369/44.14 |
| 5,581,531 | 12/1996 | Ito et al. | 369/109 |
| 5,590,110 | 12/1996 | Sato | 369/112 |
| 5,600,614 | 2/1997 | Katayama | 369/44.23 |
| 5,610,895 | 3/1997 | Izumi et al. | 369/44.23 |
| 5,644,420 | 7/1997 | Nakane et al. | 369/44.23 |

FOREIGN PATENT DOCUMENTS

| 0346844 | 12/1989 | European Pat. Off. |
| 64-25982 | 1/1989 | Japan |
| 2-12624 | 1/1990 | Japan |
| 2-116032 | 4/1990 | Japan |
| 2-206036 | 8/1990 | Japan |
| 6-84199 | 3/1994 | Japan |

*Primary Examiner*—Nabil Hindi
*Attorney, Agent, or Firm*—Sughrue, Mion, Zinn, Macpeak & Seas, PLLC

[57] ABSTRACT

The optical head device disclosed has a light source, a super-resolution filter, an objective lens system a data recording medium, a reconverging lens system, and a photodetecting system including a photodetector. The super-resolution filter provides a predetermined light intensity distribution with respect to the laser light emitted from the light source. When the data recording medium is a light reflection type, the objective lens system is both for converging the light on the data recording medium and for collecting the light reflected therefrom and, when the same is a light transmission type, the objective lens system comprises a light converging lens for converging the light on the data recording medium and a light collecting lens for collecting the light transmitted through the data recording medium. The objective lens system has a numerical aperture larger for the light collecting than that for the light converging. The re-converging lens system is for converging the light from the data recording medium, and the photodetector is for detecting a center portion of a flux of the light reconverged by the reconverging lens system. Even when the data recording density becomes high, the deterioration of the reproduced signal can be greatly reduced.

6 Claims, 16 Drawing Sheets

OPTICAL HEAD DEVICE UTILIZING SUPER-RESOLUTION TECHNIQUE

This is a continuation of application Ser. No. 08/559,290 filed Nov. 15, 1995 now U.S. Pat. No. 5,724,334.

BACKGROUND OF THE INVENTION (1) Field of the Invention

The present invention relates to an optical head device, and more particularly to an optical head device which is applied to a data processing device for optically recording and reproducing data, and in which the recording density is enhanced by the utilization of super-resolution technique.

(2) Description of the Related Art

In an optical head device which is employed in a data processing devices for optically recording and reproducing data in a recording medium such as an optical disk by using changes in profiles, optical properties or magnetic properties, there is a demand for increasing the memory capacity. In order to enhance the recording density, it is effective to reduce a size of a spot formed on the recording medium by the light beam.

Since the optical spot is formed by an objective lens (converging lens) which converges laser light onto the recording medium and the diameter of the optical spot has a relationship which is proportional to λ/NA (where the wavelength of the laser light is λ and the numerical aperture is NA), this diameter cannot be made smaller than the diffraction limit value. Therefore, in order to reduce the size of the optical spot, research is in progress on semi-conductor lasers used as the light sources, in an attempt to make the wavelength λ of the laser light shorter, and also the objective lens whose value of the numerical aperture NA is as large as possible is used.

However, the methods for attaining a shorter wave-length in a semiconductor laser and for increasing the numerical aperture NA have reached their limits. Thus, in recent years, research is being carried out on super-resolution technique as a method for reducing the spot diameter. The super-resolution technique has conventionally been known as a method wherein the light intensity of the center portion of the light beams is weakened and then is converged by an objective lens, and this enables the reduction of the size of the light spot to less than the value of diffraction limit thereof.

An optical head device with satisfactory signal reproduction has been proposed, for example, in Japanese Patent Application Kokai Publication No. Hei 2-12624 in which the super-resolution technique is applied to the optical head device thereby enabling the recording and reproduction with the size of the light spot being larger than the diffraction limit value. In the proposed optical head device, a center portion (in cross section) of the light flux of the laser light is shielded such that the light spot smaller than the diffraction limit value is formed on the recording medium, then the reflected light from the recording medium is reconverged, and only the main beam of the reflected light is detected.

FIG. 1A shows an example of a structure of a conventional optical head device which utilizes the super-resolution technique explained above. This conventional optical head device consists of a light source (semiconductor laser 1), a collimating lens 2, a super-resolution filter 3, a beamsplitter 5, an objective lens 6, a reconverging lens 8, a pinhole 9 and a photodetector 10, and a light spot is formed on a data surface of a data recording medium 7.

Now the operation of the above conventional device is explained. The laser light emitted from the semiconductor laser 1, which is the light source, is made parallel by a collimating lens 2, and is then incident on the super-resolution filter 3. At the super-resolution filter 3, a light shielding plate 35 in a band form, as shown in FIG. 2A, that is located at a region that crosses the center of the light flux 36 (in cross section) of the incident laser light, partially shields this incident laser light, whereby the light intensity distribution, as shown in FIG. 2B, is obtained.

As shown in FIG. 1A, the laser light that has passed through the super-resolution filter 3 is transmitted through the beamsplitter 5, and the light spot having an extremely small diameter is formed and irradiated on the data surface of the data recording medium 7 by the objective lens 6.

The light intensity distribution on the data recording medium 7 is as shown by the solid line 38 in FIG. 2C. When compared with the light intensity distribution which is obtained from the conventional optical head device which does not use the super-resolution filter 3 and which is shown by the dotted line 37 also in FIG. 2C, it is seen that the light spot formed has a main lobe 40 whose width is narrow. However, the light intensity of a peripheral portion of the light spot is higher than that of the ordinary light intensity distribution 37 (in dotted line) as indicated by the numeral 39 in FIG. 2C, and this is hereinafter referred to as "sidelobe".

The light spot is formed as above, and the laser light reflected from the data recording medium 7 is transmitted through the objective lens 6 shown in FIG. 1A. The transmitted light is incident on the beamsplitter 5 and is reflected at this beamsplitter. The reflected light, that is, the light that is reflected at the beamsplitter 5 with the direction of the light path having been changed, is incident on the reconverging lens 8 at which the light is reconverged. The reconverged light is transmitted through the pinhole 9 and is then incident on the photodetector 10, thus being converted to a reproduced signal.

As shown in FIG. 1B, the converged light spot at the reconverging point has a main lobe 41 and sidelobes 42, and is profiled the same as that of the light spot formed on the data recording medium 7 shown in FIG. 2C. This main lobe 41 consists mostly of the reflected light component of the main lobe 40 formed on the data recording medium 7. The pinhole 9 positioned at or near the focal point is for eliminating the sidelobes 42 and allowing only the main lobe 41 to pass through in order to suppress the deterioration of the reproduced signal caused by the reflected light from the sidelobes 39 on the data recording medium 7.

In the conventional optical head device described above, by reducing the light intensity using the super-resolution filter 3, the light spot (main beam) that is reduced in size from the diffraction limit value can be formed on the data surface of the data recording medium 7. In this way, it is possible to enhance the recording density and to increase the track density in the radial direction of the data recording medium 7.

However, with the above conventional optical head device, since the reflected light component of the side-lobes 39 on the data recording medium 7 is mixed in the main lobe 41 because of the numerical aperture limit of the objective lens 6, the method whereby only the main lobe 41 is attempted to be detected using the pinhole 9, slit, etc. cannot sufficiently suppress the deterioration of the reproduced signal.

As a method aimed at overcoming the above problem, there has been proposed an optical head device having, as shown in FIG. 3, a three-division photodetector arrangement 45 in which the photodetector 10 is arranged such that the main lobe 41 and the sidelobes 42 are optically collected separately by light receiving surfaces 45a, 45b and 45c, respectively. (Japanese Patent Application Kokai Publication No. Hei 2-206036).

In the above optical head device, the photoelectric conversion signal of the sidelobes 42 obtained at the light receiving surfaces 45b and 45c is attenuated from the photoelectric conversion signal of the main lobe 41 obtained at the light receiving surface 45a of the three-division photodetector 45 and, by using the resulting differential signal, the in-phase removal is made of the reflected light components of the sidelobes 39 on the data recording medium 7 that are mixed in the main lobe 41.

In all of the above explained conventional optical head devices, various means are employed for preventing the deterioration of the reproduced signal caused by the passing around of the reflected light of the sidelobes 39 on the data recording medium 7 to the main lobe 41 on the photodetector 10. However, it has been a problem that, when the data recording density is increased, none of such means can sufficiently prevent the deterioration of the reproduced signal.

Further, there is a conventional optical head device in which, by positioning a number of photodetectors at the periphery of the objective lens, the aperture of the objective lens in the light collecting system is made quaisi-large (Japanese Patent Application Kokai Publication No. Hei 2-116032), or in which the returning light from the optical disk is detected by the objective lens that has a larger NA than that for the incident light (Japanese Patent Application Kokai Publication No. Hei 6-84199). However, in these conventional optical head devices, the super-resolution effects are not utilized. Also, their objective is to increase the amplitude of the reproduced signal.

SUMMARY OF THE INVENTION

An object of the present invention is to overcome the problems existing in the prior art and to provide an optical head device in which, even when the data recording density becomes high, the deterioration of the reproduced signal can be greatly reduced.

Another object of the present invention is to provide an optical head device in which it is possible to magnify changes in the intensity of the reflected light or transmitted light from the data recording medium of a phase modulation type.

According to a first aspect of the invention, there is provided an optical head device comprising:

a light source for emitting laser light;

a super-resolution filter for providing a predetermined light intensity distribution on a data recording medium with respect to a laser light from the light source;

an objective lens for converging on a data recording medium the laser light that has passed through the super-resolution filter and for collecting the light from the data recording medium;

a reconverging lens means for reconverging the light that has been reflected from the data recording medium and has been transmitted through the objective lens;

a photo-detecting means for detecting a center portion of a flux of the light reconverged by the reconverging lens system; and the objective lens having a numerical aperture that is larger for collecting the light from the data recording medium than that for converging the light thereon.

According to a second aspect of the invention, there is provided an optical head device comprising:

a light source for emitting laser light;

a super-resolution filter for providing a predetermined light intensity distribution with respect to the laser light from the light source;

an objective lens for converging on a data recording medium the laser light that has passed through the super-resolution filter and for collecting the light from the data recording medium;

a reconverging optical means for reconverging the light that has been reflected from the data recording medium and has been transmitted through the objective lens;

a light pass limiting means for allowing a center portion of a flux of the light reconverged by the reconverging optical means to pass;

a photo-detecting means for detecting the light that has passed through the light path limiting means; and a incident light optical means for causing the light having passed the light path limiting means to be diffracted/scattered and to be incident on the photo-detecting means while being subjected to aperture limitation by a fixed aperture, the objective lens having a numerical aperture that is larger for collecting the light from the data recording medium than that for converging the light thereon.

According to a third aspect of the invention, there is provided an optical head device comprising:

a light source for emitting laser light;

a super-resolution producing means for producing a super-resolution spot of light on a data recording medium of a light transmitting type;

a light converging lens for converging, on the data recording medium, the light that has passed through the super-resolution producing means;

a light collecting lens for collecting the light that has been transmitted through the data recording medium;

a reconverging lens means for reconverging the light from the light collecting lens; and a photo-detecting means for detecting a center portion of the light reconverged by the reconverging lens system, the light collecting lens having a numeral aperture larger than that of the light converging lens.

In the optical head device according to the invention, since the objective lens has an NA that is larger for collecting the light from the data recording medium than that for converging the light thereon, there is less NA limitation in the objective lens during the light collection as compared with that in the conventional optical head device so that even most of the high spatial frequency component of the spot from the data recording medium passes through the objective lens and is incident on the reconverging optical system.

In the optical head device according to the second aspect of the invention, since the light having passed through the light passing limitation means is diffracted/scattered and is incident on the photodetector while it is subjected to the aperture limitation by a fixed aperture so that, even when the objective lens has an NA that is larger for collecting the light from the data recording medium than that for converging the light thereon, it is possible to magnify changes in the intensity of the reflected light on the data recording medium of a phase modulation type.

One of the above identified prior art references (Japanese Patent Application Kokai Publication No. Hei 6-84199)

proposes an optical reading device in which the reflected light from the optical disk is detected by the objective lens having an NA larger than that for the incident light. However, the proposed reading device is for enlarging amplitudes of the reproduced signal by collecting all the light-beams reflected at a reflecting film having light intensity dependency, and is not provided with a super-resolution filter. Thus, the proposed device is structurally and functionally different from the optical head device according to the present invention in which, by utilizing the super-resolution filter, it is possible to prevent the deterioration of the reproduced signal caused by the passing around of the reflected light of the sidelobes on the data recording medium that occur when the light spot is made small.

In the optical head device according to the third aspect of the invention, the objective lens system consists of a converging objective lens and a collecting objective lens. The cause for the deterioration of the reproduced signal due to the mixing of the sidelobes on the optical disk into the position of the main lobe is the elimination of the high spatial frequency component of the spot on the optical disk by the numerical aperture limitation of the light collecting objective lens. Thus, by making the NA of the collecting objective lens larger than that of the converging objective lens, it makes it possible to collect the light of the above mentioned high spatial frequency component, and this enables the suppression, to a minimum, of the mixing of the light of the sidelobes on the data recording medium into the position of the main lobe. Thus, where the sidelobes are ultimately eliminated using the pinhole, slit, etc., only the main lobe may be optically collected.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are explained with reference to the drawings.

Figure 4:
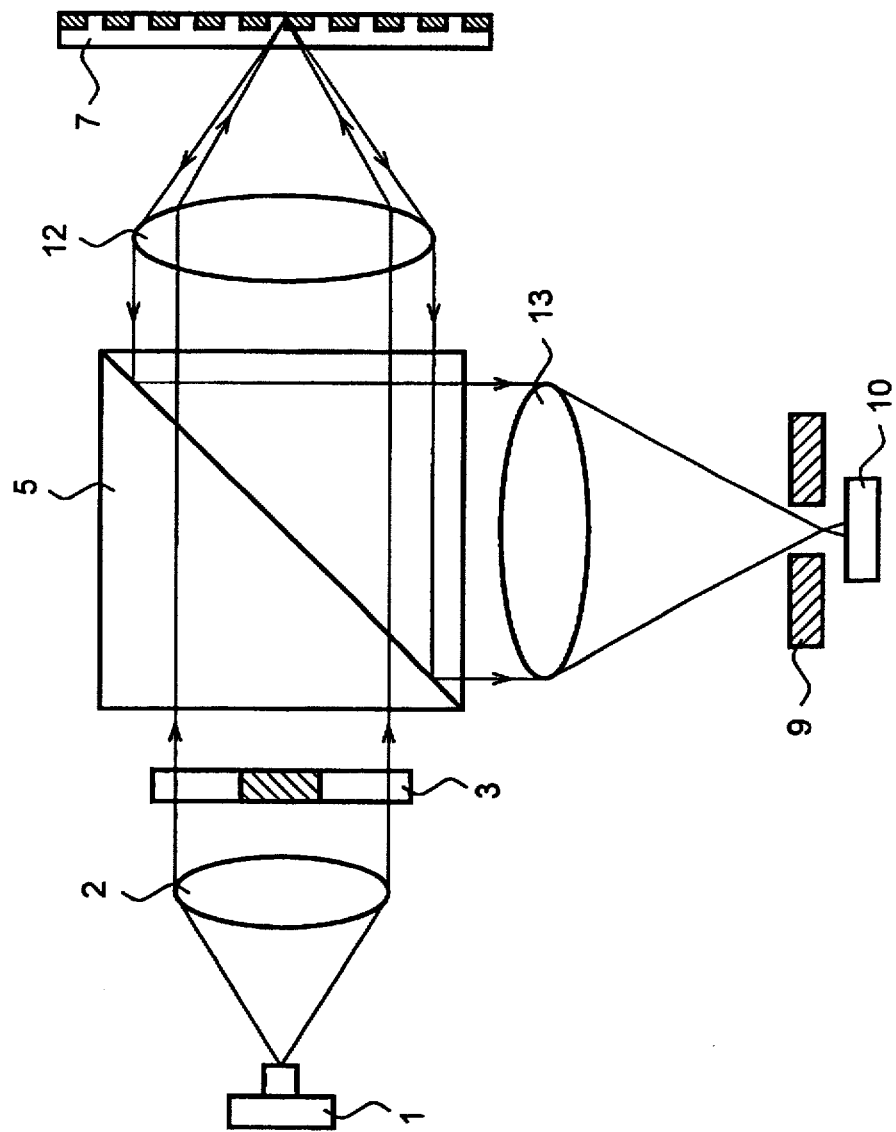
FIG. 4 is a diagram showing a system configuration of an optical system of a first embodiment according to the invention.

FIG. 4 shows a system configuration of a first embodiment according to the invention. In the drawings, the same or similar numerals or symbols are used for the same or similar elements as in FIG. 1A, and the explanation thereof is not repeated. As shown in FIG. 4, the system comprises a light source 1, a collimating lens 2, a super-resolution filter 3, a beamsplitter 5, a pin hole 9, a photodetector 10, an objective lens 12, and a reconverging lens 13.

Figure 1A:
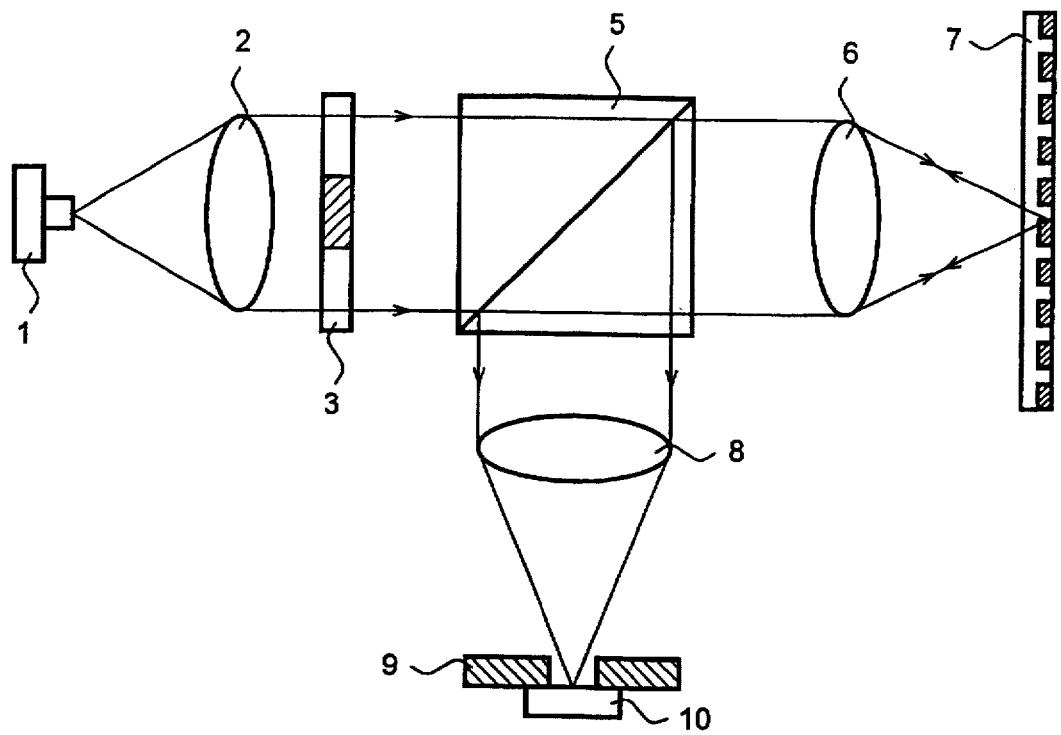
FIG. 1A is a diagram showing a conventional optical system configuration and FIG. 1B is a diagram showing a light intensity distribution of a spot formed by a converging lens in the conventional optical system.
Figure 1B:
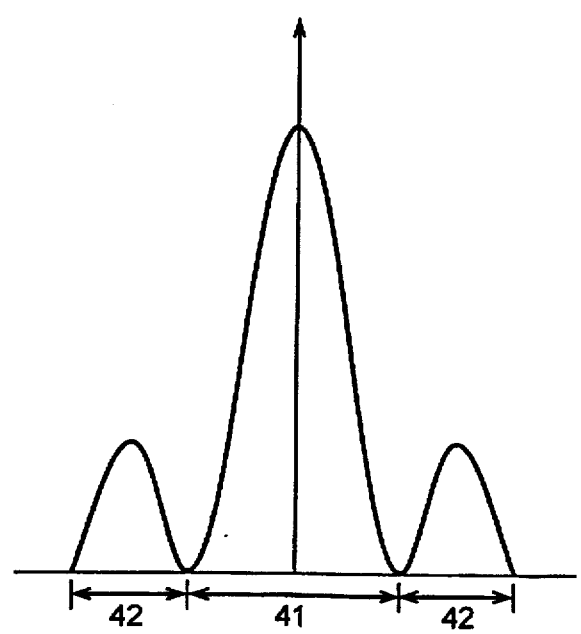

In the conventional optical head device shown in FIG. 1A, the objective lens 6 is used both for converging the light on the data recording medium 7 and collecting the light reflected from the data recording medium 7, and the NA thereof is the same both during the light converging and the light collecting. However, in this embodiment according to the invention, as shown in FIG. 4, the NA of the objective lens 12 for converging the light on the data recording medium 7 is larger than the NA actually used during the light converging.

That is, by providing the objective lens 12 whose diameter is larger than that of the light which is incident on the objective lens 12 through the beamsplitter 5, the NA of the objective lens 12 is made larger during light collecting than that during the light converging. Also, in correspondence with the NA of the objective lens 12 for the light collection, the diameter of the reconverging lens 13 used is larger as compared with that of the conventional reconverging lens 8.

Now, the operation of the device of this first embodiment is explained. The laser light emitted from the light source 1 is made parallel by the collimating lens 2, is then incident on the objective lens 12 after a part of the flux of beams is shielded and modulated by the super-resolution filter 3, and the resulting light is transmitted through the beamsplitter 5, whereby the light is converged on the data recording medium 7 of a form such as a disk form or a card form. Because of the super-resolution effect already explained, the diameter of the spot on the data recording medium 7 converged by the objective lens 12 becomes smaller than that when a super-resolution filter is not present, but there is occurrence of sidelobes at the same time.

The objective lens 12 collects the beams of the light modulated and reflected by the pit on the data recording medium 7 in an NA larger for collecting the light than that for converging the light, and changes them to parallel beams. The parallel beams that are reflected on the beamsplitter 5 and have changed their paths are incident on the reconverging lens 13, whereby the light is reconverged and only the light flux at a center portion is transmitted through the pinhole 9 positioned at the focal point. The transmitted light is incident on the photodetector 10 where the light is photoelectrically converted to the reproduced signal.

Figure 5A:
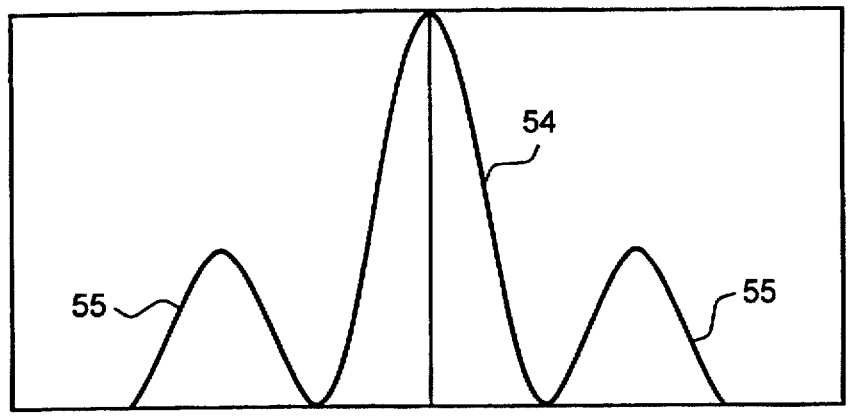
FIGS. 5A-5C are graphs for showing the light intensity distribution on the data recording medium and on the photo-detecting means in the embodiments according to the invention.

The light intensity distribution on the data recording medium 7, in the case where the wavelength of the laser light emitted from the light source 1 is 0.78 μm, the objective lens 12 used has a focal length of 3 mm and an NA of 0.45, and the super-resolution filter 3 used has a shielding band having a width of 0.9 mm which reduces the beam diameter by 30%, is as shown in FIG. 5A. The fact that the light intensity distribution consists of a main lobe 54 and sidelobes 55 is the same as in the prior art.

Figure 5B:
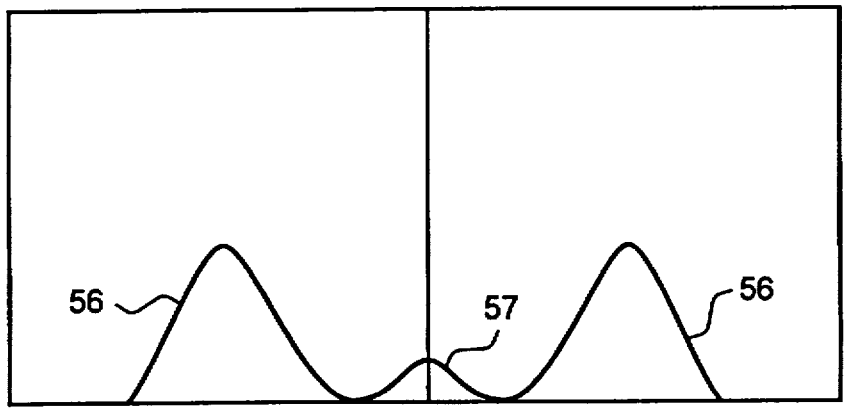
Figure 5C:
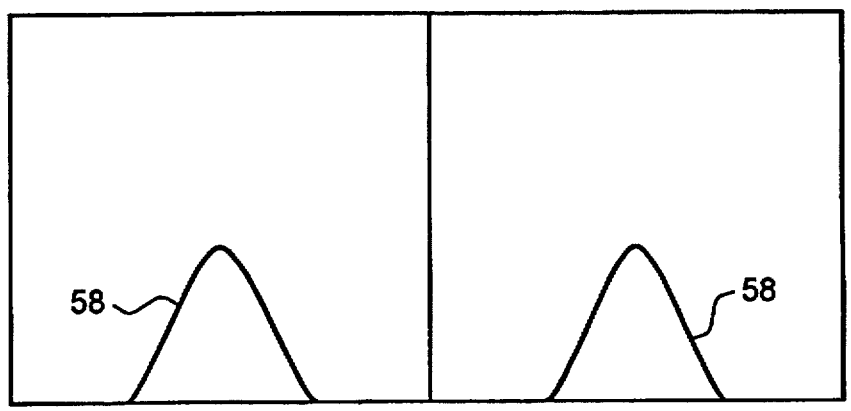

When only the sidelobes 55 of the converged spot as shown by the above light intensity distribution are taken out, the light intensity distribution of the image formed on the photodetector 10 is as shown in FIGS. 5B and 5C. FIG. 5B shows the case where the NA of the objective lens during the light collecting is the same as that during the light converging as is the case in the prior art. In this case, the sidelobes 55 on the data recording medium 7 are mixed into the position of the main lobe so that there develop not only the sidelobes 56 but also a light component 57 caused by the passing around of the sidelobes 55 at the position of the main lobe, which becomes a cause for the deterioration of the reproduced signal. This is because the high spatial frequency component of the spot on the data recording medium 7 is removed as a result of the NA limitation to the objective lens during the light collection.

On the other hand, with respect to the arrangement according to this first embodiment of the invention, FIG. 5C shows the light intensity distribution on the photodetector 10 when the objective lens 12 used has a larger NA during the light collecting than that during the light converging. The sidelobes shown in FIG. 5C consist of two sidelobes 58 which have been restored to approximately the same shapes as the sidelobes 55 in the light intensity distribution on the data recording medium 7, and this shows the suppression of the mixing of the sidelobes 55 on the data recording medium 7 into the position of the main lobe.

Therefore, as shown in FIG. 4, where only the main lobe is allowed to be transmitted by the pinhole 9 (or a slit), the sidelobes 58 are eliminated and, since there is no passing around of the light from the sidelobes 55 on the data recording medium 7, the deterioration of the reproduced signal is suppressed.

Figure 6:
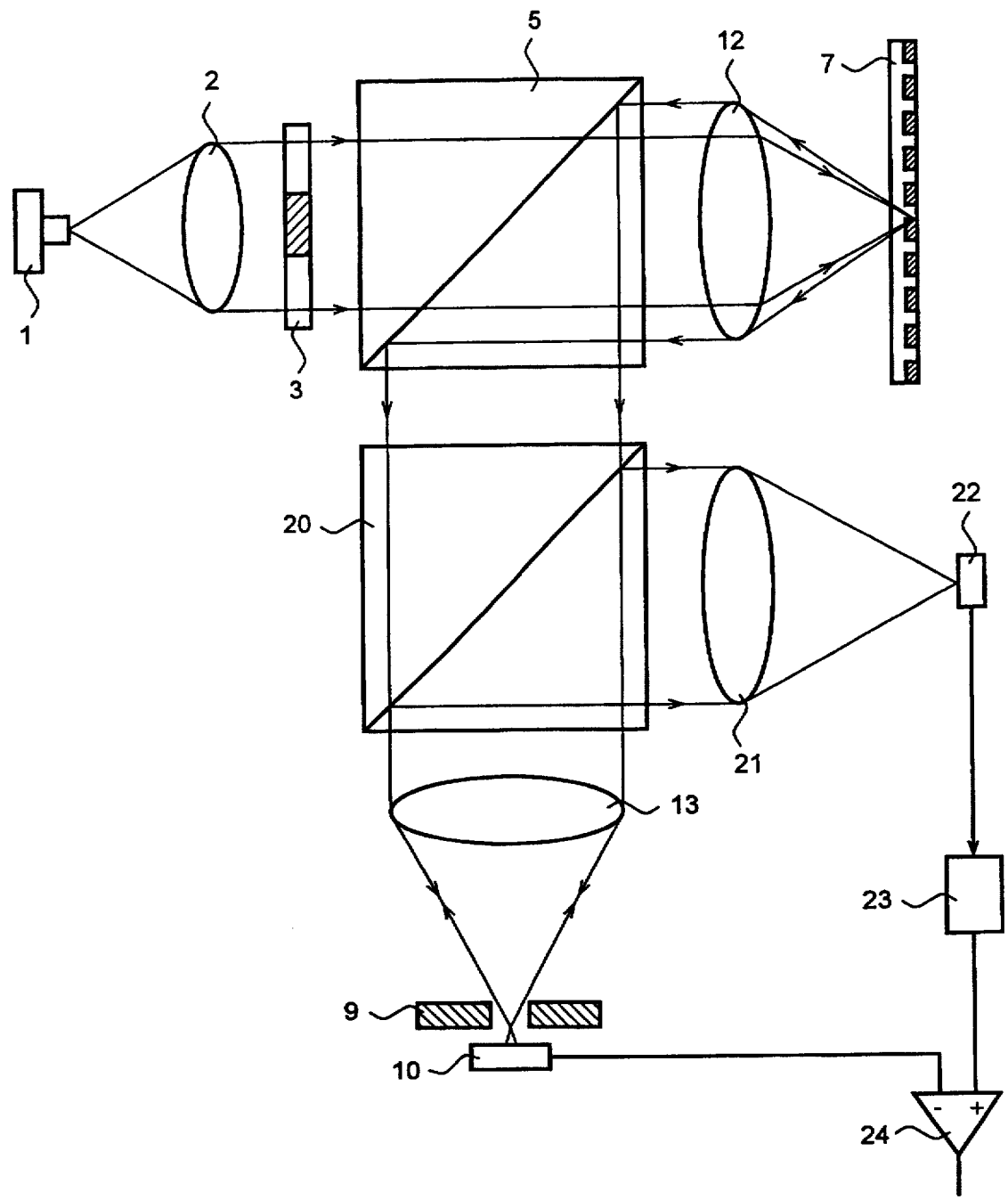
FIG. 6 is a diagram showing a system configuration of an optical system of a second embodiment according to the invention.

Next, a second embodiment of the invention is explained. FIG. 6 shows a system configuration of the second embodiment according to the invention. In the drawings, the same or similar reference numerals or symbols are used for the same or similar elements as in FIG. 4, and the explanation thereof is not repeated. As shown in FIG. 6, in this embodiment, a second beamsplitter 20, a second reconverging lens 21, a second photodetector 22, an attenuator 23 and a differential amplifier 24 are provided between the beamsplitter 5 and the reconverging lens 13 shown in FIG. 4.

The system of this second embodiment operates as explained below. The light beams reflected from the data recording medium 7 are made parallel by the objective lens 12, and then reflected by the beamsplitter 5 before being incident on the beamsplitter 20. The beamsplitter 20 transmits the light beams from the beamsplitter 5, and the transmitted beams are incident on the reconverging lens 13. The beams incident from the reconverging lens 13 are reflected.

Thus, the reconverging lens 13 transmits the reflected light beams consisting of the main lobe and the sidelobes from the data recording medium 7, and the transmitted light beams are irradiated on the light receiving surface of the photodetector 10 after the sidelobes are eliminated by the pinhole 9. At this time, by the pinhole 9, the sidelobes mentioned above are reflected, and the reflected light is transmitted by the reconverging lens 13, the transmitted light is reflected at the beamsplitter 20, and the reflected light is reconverged on the light receiving surface of the photodetector 22 through the reconverging lens 21.

Therefore, the electric signal obtained by photoelectric conversion at the photodetector 22 is of a signal component, though in a small amount, which consists of the sidelobes. This is supplied to the attenuator 23 and, after being attenuated to an appropriate level, is supplied to the differential amplifier 24. On the other hand, the photodetector 10 provides an electric signal (reproduced signal) by photoelectrically converting the light which consists mainly of the main lobe on the data recording medium 7 but which also includes a light component consisting of a small amount of sidelobes, and supplies this electrical signal to the differential amplifier 24. In this way, it is possible to obtain from the differential amplifier 24 a high quality reproduced signal in which effect from the sidelobes is greatly suppressed.

In this second embodiment, as in the first embodiment, when only the sidelobes 55 from the converged spot formed on the data recording medium 7 are taken out and an image thereof is formed on the photodetector 10 in a state wherein no pinhole 9 is provided, the light intensity distribution on the photodetector 10 consists of the sidelobes 58 as shown in FIG. 5C that are restored to almost the same shapes as the sidelobes 55 of the light intensity distribution on the data recording medium 7. Thus, since only the main lobe is transmitted through the pinhole 9, the sidelobes 58 are eliminated. Also, since there is no occurrence of the passing around of the sidelobes 55 formed on the data recording medium 7, the deterioration of the reproduced signal is suppressed.

Figure 3:
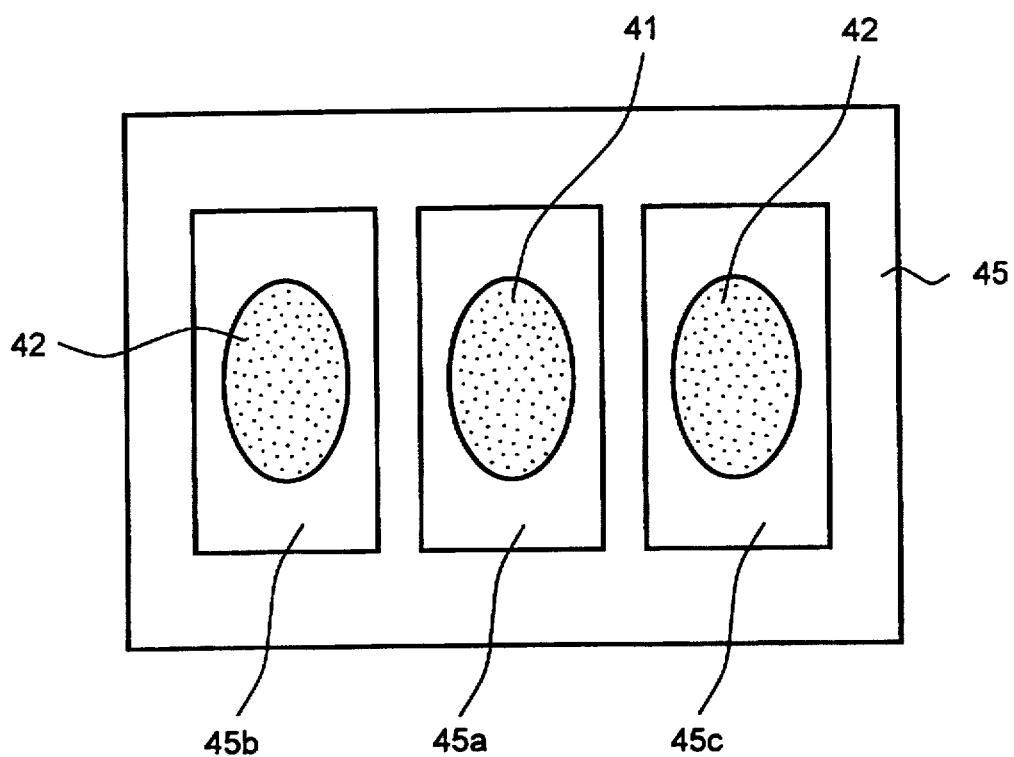
FIG. 3 is a diagram showing an example of a photo-detecting means in a conventional optical system.
Figure 7:
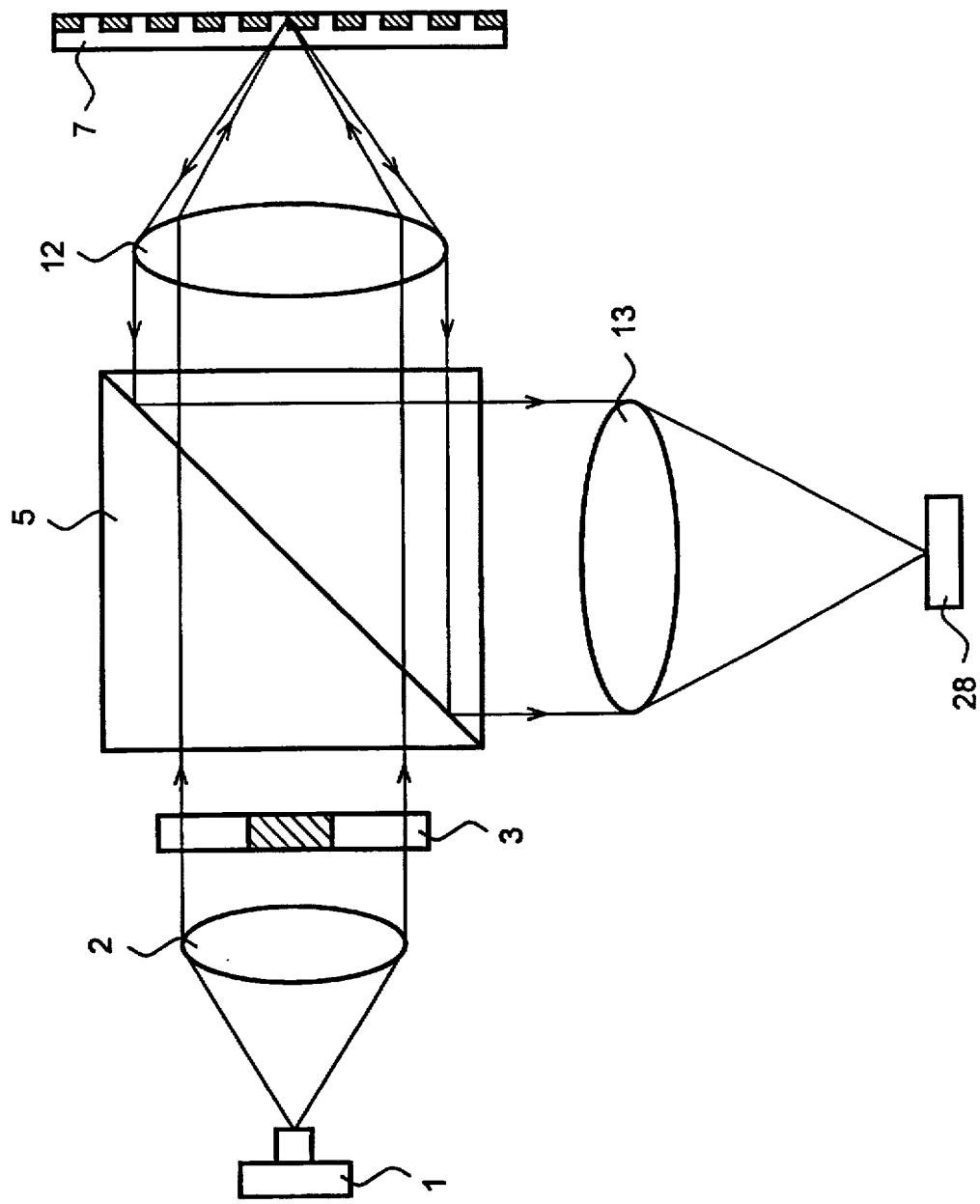
FIG. 7 is a diagram showing a system configuration of an optical system of a third embodiment according to the invention.

Next, a third embodiment according to the invention shown in FIG. 7 is explained. In the drawings, the same reference numeral is assigned to the same element as in FIG. 4 and the same explanation is not repeated. As seen from FIG. 7, in this third embodiment, in place of the pinhole 9 and the photodetector 10, the same three-division photodetector 28 shown as the three-division photodetector 45 in FIG. 3 is used.

As already explained, the three-division photodetector 28 collects and photoelectrically converts the main lobe and the sidelobes separately from each other, and out of the resulting electrical signal, the electrical signal resulting from the sidelobes is appropriately attenuated so as to produce a differential signal resulting from the difference with respect to the main lobe, whereby a reproduced signal is obtained.

In this third embodiment, too, as in the first embodiment, since the light intensity distribution of the image formed on the three-division photodetector 28 when only the sidelobes 55 are taken out from the converged spot on the data recording medium 7 is as shown in FIG. 5C, there is no occurrence of the passing around of the sidelobes 55 on the data recording medium 7 into the position of the main lobe, and this enables the suppression of the deterioration of the reproduced signal.

Figure 8:
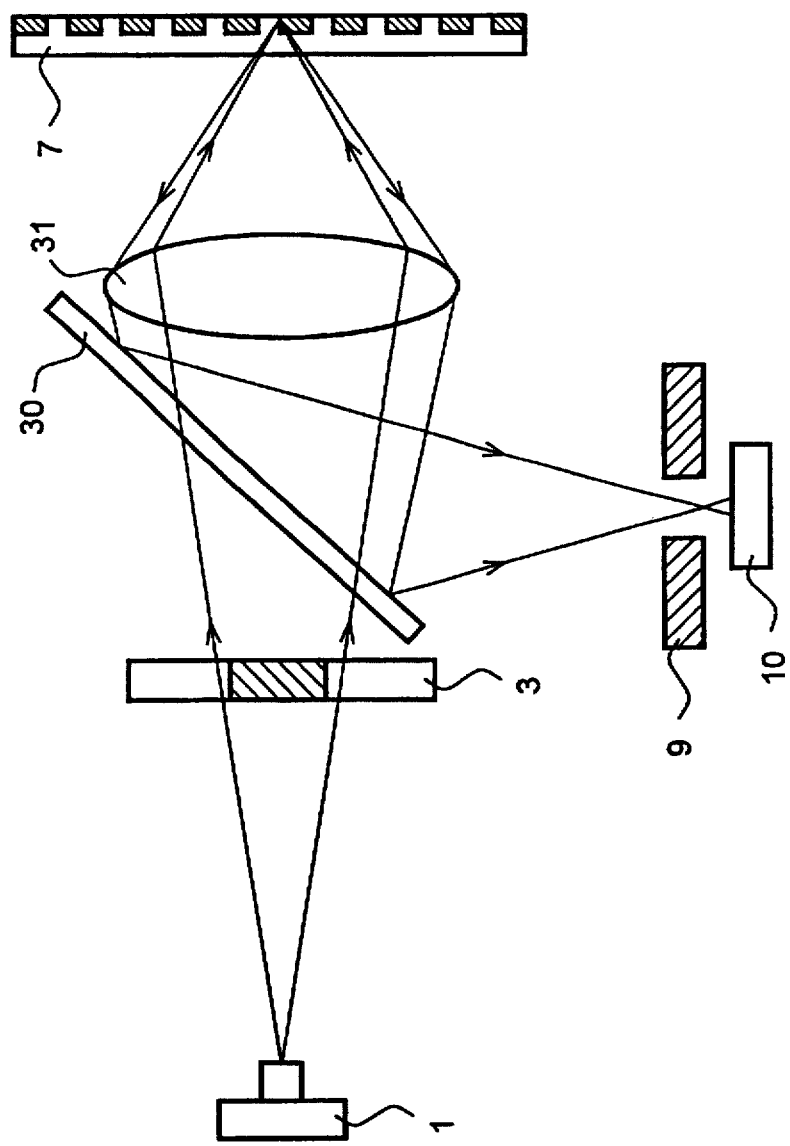
FIG. 8 is a diagram showing a system configuration of an optical system of a fourth embodiment according to the invention.

Next, a fourth embodiment according to the invention is explained. FIG. 8 shows a system configuration of an optical head device of the fourth embodiment. In the drawings, the same reference numerals and symbols are used for the same elements as in FIG. 4 and the same explanation is not repeated. As shown in FIG. 8, in this fourth embodiment, instead of the collimating lens 2, an infinite objective lens 31 is provided.

In this fourth embodiment, the laser light from the light source 1 is transmitted through the super-resolution filter 3 and the beamsplitter 30, and the transmitted light is incident on the objective lens 31 and is then focussed and converged on the data recording medium 7 by the objective lens 31. The light reflected from the data recording medium 7 is incident on and reflected from the beamsplitter 30 through the objective lens 31, and the reflected light is collected by the photodetector 10 positioned at the location of the focal point.

In this fourth embodiment, too, as in the other embodiments, the NA of the objective lens 31 during the light collecting is made larger than that during the light converging so that the sidelobes are removed and there is no occurrence of the passing around of the sidelobes formed on the data recording medium, resulting in the suppression of the deterioration of the reproduced signal.

Figure 2A:
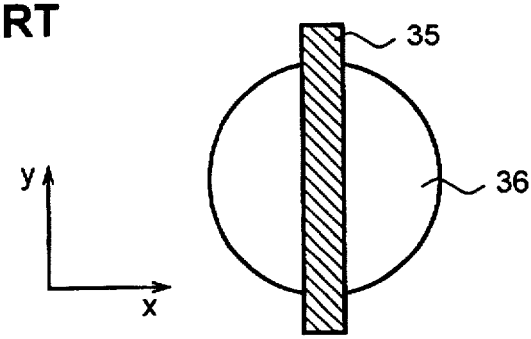
FIGS. 2A-2C are graphs for showing super-resolution effects in the conventional optical system, FIG. 2A showing a location of a super-resolution filter used in the system, and FIGS. 2B and 2C showing the light intensity distribution obtained.
Figure 2B:
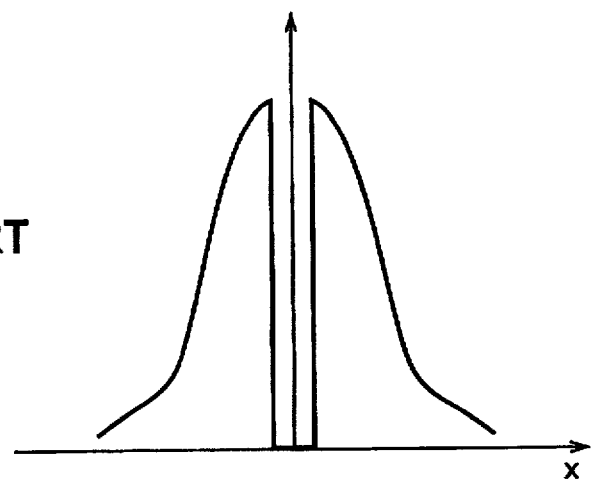
Figure 2C:
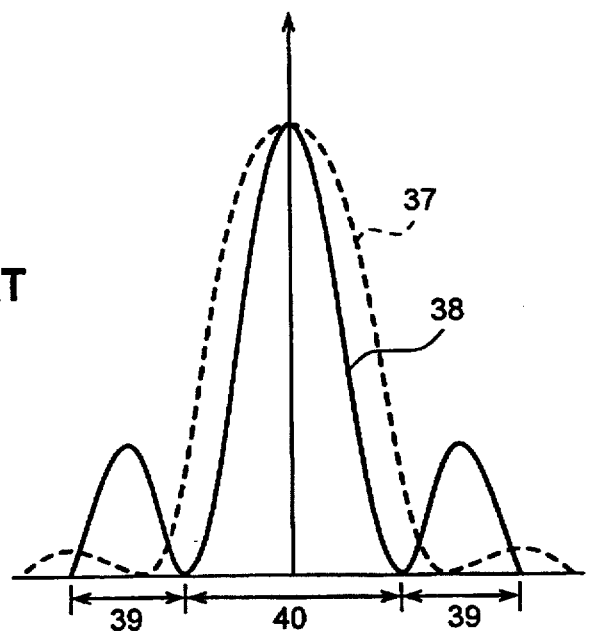

It is to be noted that the present invention is not limited to the embodiments explained above. Types of other available filters for use as the super-resolution filter 3 include a light intensity modulation type or a light phase modulation type that utilizes a light shielding plate or a phase plate for modulating the light or a prism for separating the path of light. The shapes of the light shielding plate or the phase plate include those of one dimensional as shown in FIG. 2A or two dimensional and, in the case of the two dimensional shape, the plate may be in a disk shape or in an annular shape. For the explanation of the embodiments, only the first order component of the sidelobes of the super-resolution spot are referred to, but it is to be understood that sidelobes of a higher order may also exist.

The data recording medium 7 may be applied to a medium which has pits of a phase modulation type, pits of a light intensity modulation type, and pits of a plane of polarization inclination modulation type. Specifically, the data recording medium 7 may be applied to, for example, a compact disk of a type such as a read-only type utilizing variations in undulations, a write once read many type, a rewritable phase change type, and a magneto-optic type.

As explained above, since the NA of the objective lens for collecting the light from the data recording medium is made larger than that for converging the light thereon and the high spatial frequency component of the spot on the data recording medium mostly passes through the objective lens before being incident on the reconverging optical system, it is possible to suppress the mixing of the side-lobe light on the data recording medium into the main lobe position. In this way, even when the data recording density becomes high, the deterioration of the reproduced signal can be greatly suppressed.

Further, since the NA of the light converging objective lens is the same as that in the prior art, the effect of the expanding of beams caused by the tilting of the objective lens or the data recording medium is suppressed to the same extend as in the prior art.

The foregoing has explained the first aspect of the invention covering the first to fourth embodiments.

Now, the second aspect of the invention is explained, which covers the following fifth to seventh embodiments.

Figure 9:
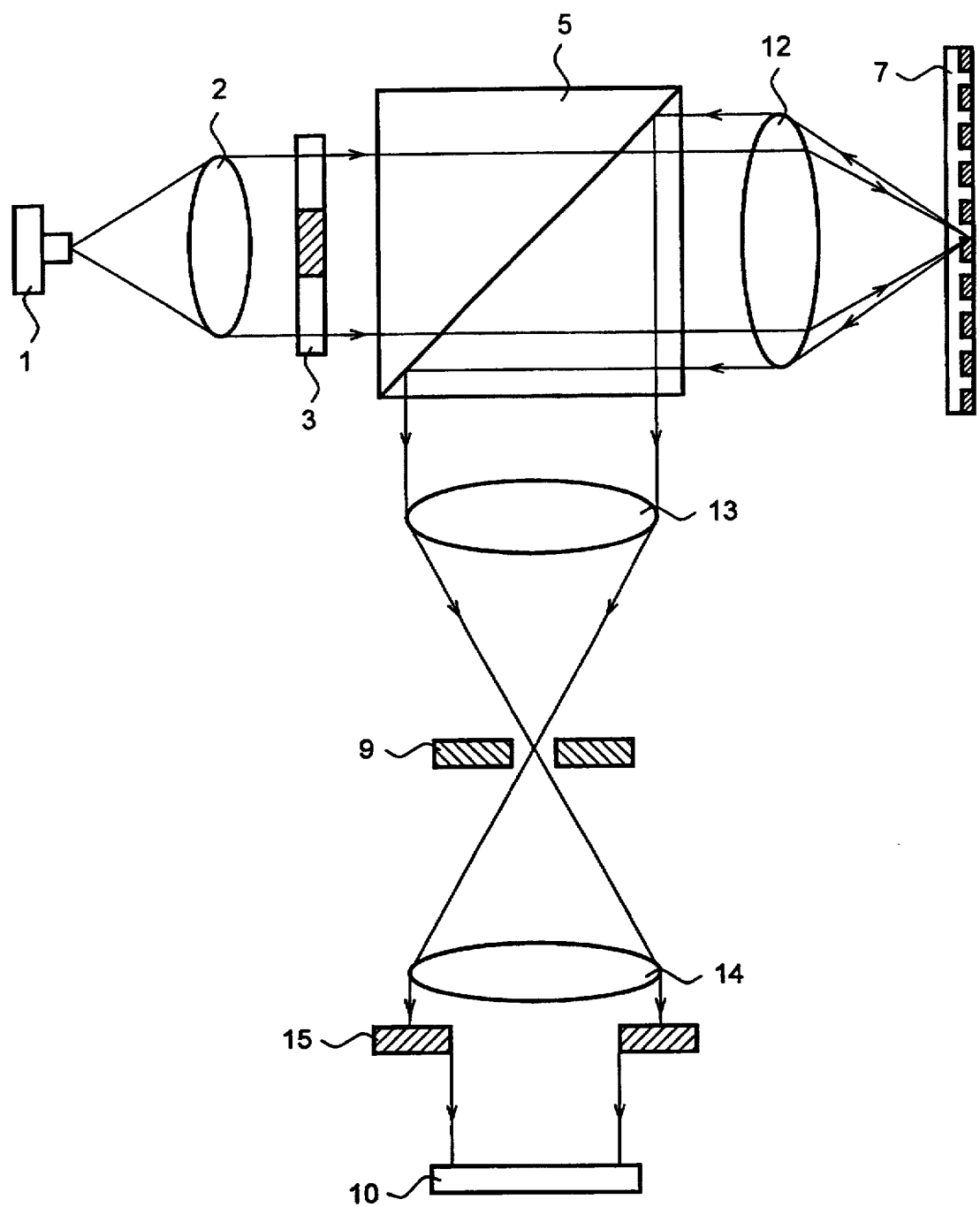
FIG. 9 is a diagram showing a system configuration of an optical system of a fifth embodiment according to the invention.

FIG. 9 shows a system configuration of the fifth embodiment according to the invention. In the drawings, the same or similar numerals or symbols are used for the same or similar elements as in FIG. 1A, and the explanation thereof is not repeated. As shown in FIG. 9, the system comprises a light source 1, a collimating lens 2, a super-resolution filter 3, a beamsplitter 5, a pin hole 9, a photodetector 10, an objective lens 12, a reconverging lens 13, a detecting lens 14 and an aperture 15.

In the conventional optical head device shown in FIG. 1A, the objective lens 6 is used both for converging the light on the data recording medium 7 and collecting the light reflected from the data recording medium 7, and the NA thereof is the same both during the light converging and the light collecting. In this fifth embodiment, as shown in FIG. 9, the NA of the objective lens 12 for converging the light on the data recording medium 7 is made larger than the NA actually used during the light converging. That is, by providing the objective lens 12 whose diameter is larger than that of the light which is incident on the objective lens 2 through the beamsplitter 5, the NA at the time when the objective lens 12 collects the light is made larger than that at the time when the light is converged. Also, in correspondence with the NA of the objective lens 12 for the light collecting, the reconverging lens 13 used is larger as compared with the conventional reconverging lens 8.

The data recording medium 7 used is that of a phase modulation type having pits in which data is recorded as changes in undulations on the recording surface of a disk such as a compact disk. However, the shape of the data recording medium 7 may either be a disk shape or a card shape.

Now, the operation of the device of this fifth embodiment is explained. The laser light emitted from the light source 1 is made parallel by the collimating lens 2, the parallel light is then incident on the objective lens 12 after a part of the flux of beams is shielded and modulated by the super-resolution filter 3 and the resulting light is transmitted through the beamsplitter 5, whereby the light is converged on the data recording medium 7 of a phase modulation type. Because of the super-resolution effect already explained, the diameter of the spot on the data recording medium 7 converged by the objective lens 12 becomes smaller than that when a super-resolution filter 3 is not present, but there is occurrence of sidelobes at the same time.

The objective lens 12 collects the beams of light modulated and reflected by the pit on the data recording medium 7 in an NA larger for the light collecting than that for the light converging, and changes them to parallel beams. The parallel beams that are reflected on the beamsplitter 5 and have changed their paths are incident on the reconverging lens 13, whereby the light is reconverged and only the light flux at a center portion is transmitted through the pinhole 9 positioned at the focal point.

The light intensity distribution on the data recording medium 7, in the case where the wavelength of the laser light emitted from the light source 1 is 0.78 μm, the objective lens 12 used has a focal length of 3 mm and an NA of 0.45, and the super-resolution filter 3 used has a shielding band having a width of 0.9 mm which reduces the beam diameter by 30%, is as shown in FIG. 5A. It is note therefrom that the light intensity distribution consists of a main lobe 54 and sidelobes 55 as is the case in the prior art.

When only the sidelobes 55 of the converged spot as shown by the above light intensity distribution are taken out, the light intensity distribution at the reconverged light spot is as shown in FIGS. 5B and 5C. FIG. 5B shows the case where the NA of the objective lens during the light collecting is the same as that during the light converging as is the case in the prior art. In this case, the sidelobes 55 on the data recording medium 7 are mixed into the position of the main lobe so that there develop not only the sidelobes 56 but also a light component 57 caused by the passing around of the sidelobes 55 at the position of the main lobe, which becomes a cause for the deterioration of the reproduced signal. This is because the high spatial frequency component of the spot on the data recording medium 7 is removed as a result of the NA limitation to the objective lens during the light collection.

On the other hand, with respect to the arrangement according to this fifth embodiment of the invention, FIG. 5C shows the light intensity distribution on the pinhole 9 when the objective lens 12 used has a larger NA during the light collecting than that during the light converging. The sidelobes shown in FIG. 5C consist of two sidelobes 58 which have been restored to approximately the same shapes as the sidelobes 55 in the light intensity distribution on the data recording medium 7, and this shows the suppression of the mixing of the sidelobes 55 on the data recording medium 7 into the position of the main lobe.

Therefore, as shown in FIG. 9, where only the main lobe is allowed to be transmitted by the pinhole 9 (or a slit), the sidelobes 58 are eliminated and, since there is no passing around of the light from the sidelobes 55 on the data recording medium 7, the deterioration of the reproduced signal is suppressed.

In the case where the data recording medium 7 has pits of a phase modulation type such as in a compact disk, the phase of the light irradiated on the pit portion is modulated so that the light is diffracted/scattered. The reflected light from the data recording medium 7 is scattered out of the aperture of the objective lens 12 so that the amount of the returning light (reflected light) to the signal detecting system becomes small. By utilizing this change, the reflected light is read out as the reproducing signal. However, where the NA of the objective lens 12 is made large during the light collection, the same light spot as the light spot after the modulation of the light on the data recording medium 7 is restored on the pinhole 9, and also the change in the amount of the returning light (reflected light) becomes small resulting in a small amplitude in the reproduced signal.

Thus, in this fifth embodiment, only the main lobe in which the passing around of the sidelobes 55 has been suppressed by the pinhole 9 is taken out, and the resulting light is again diffracted/scattered and then collected by the detecting lens 14. The light thus collected is subjected to aperture limitation by a predetermined aperture 15 before being incident on the photodetector 10. In this way, the change in the amount of light becomes large so that the lowering of the amplitude of the reproduced signal is prevented.

Figure 10:
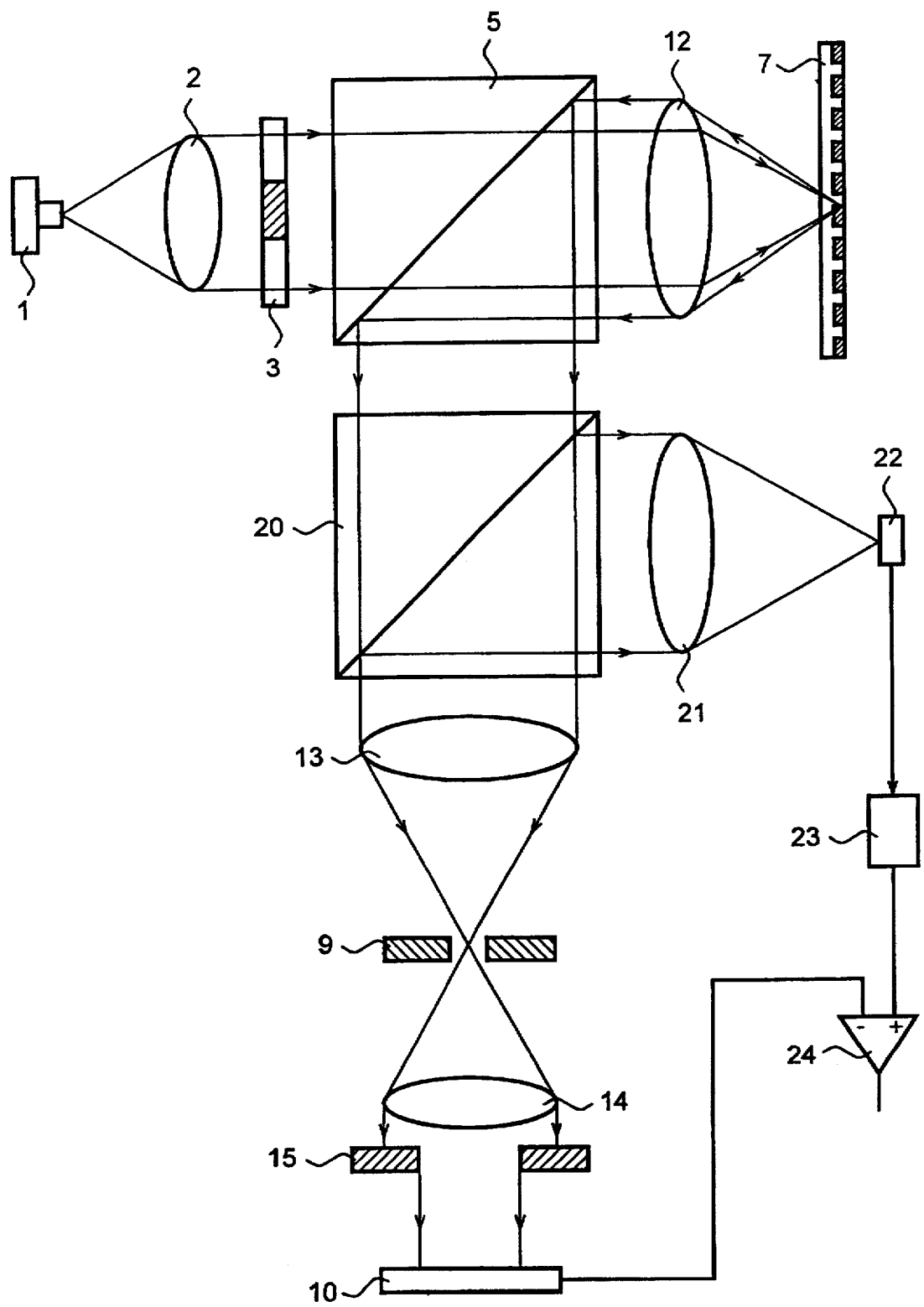
FIG. 10 is a diagram showing a system configuration of an optical system of a sixth embodiment according to the invention.

Next, the sixth embodiment of the invention is explained. FIG. 10 shows a system configuration of the sixth embodiment according to the invention. In the drawings, the same or similar reference numerals or symbols are used for the same or similar elements as in FIG. 9, and the explanation thereof is not repeated. As shown in FIG. 10, in this sixth embodiment, a second beamsplitter 20, a second reconverging lens 21, a second photodetector 22, an attenuator 23 and a differential amplifier 24 are provided between the beamsplitter 5 and the reconverging lens 13 shown in FIG. 9.

The system of this sixth embodiment operates as explained below. The light beams from the data recording medium 7 are made parallel by the objective lens 12, and then reflected by the beamsplitter 5 before being incident on the beamsplitter 20. The beamsplitter 20 transmits the light beams from the beamsplitter 5, and the transmitted beams are incident on the reconverging lens 13. The beams incident from the reconverging lens 13 are reflected.

Thus, the reconverging lens 13 transmits the reflected light beams consisting of the main lobe and the sidelobes from the data recording medium, and the transmitted light beams are irradiated on the light receiving surface of the photodetector 10 after the sidelobes are eliminated by the pinhole 9. Then, the light beams pass through the photodetecting lens 14 and the aperture 15, and are irradiated on the light receiving surface of the photodetector 10. At this time, by the pinhole 9 and the aperture 15, the sidelobes mentioned above are reflected, and the light thus reflected is transmitted by the reconverging lens 13, is reflected at the beamsplitter 20, and is reconverged on the light receiving surface of the photodetector 22 through the reconverging lens 21.

Therefore, the electric signal obtained by photoelectric conversion at the photodetector 22 is of a signal component consisting of the sidelobes. This is supplied to the attenuator 23 and, after being attenuated to an appropriate level, is supplied to the differential amplifier 24. On the other hand, the photodetector 10 provides an electric signal (reproduced signal) by photoelectrically converting the light which consists mainly of the main lobe on the data recording medium 7 but which also includes a light component consisting of a small amount of sidelobes, and supplies this electrical signal to the differential amplifier 24. In this way, it is possible to obtain from the differential amplifier 24 a high quality reproduced signal in which effect from the sidelobes is greatly suppressed.

In this sixth embodiment, as in the fifth embodiment, when only the sidelobes 55 from the converged spot formed on the data recording medium 7 are taken out and an image thereof is formed on the pinhole 9, the light intensity distribution on the pinhole 9 consists of the sidelobes 58 as shown in FIG. 5C that are restored to almost the same shapes as the sidelobes 55 of the light intensity distribution on the data recording medium. Thus, since only the main lobe is transmitted through the pinhole 9, the side-lobes 58 are eliminated. Also, since there is no occurrence of the passing around of the sidelobes 55 formed on the data recording medium, the deterioration of the reproduced signal is suppressed.

Also, in this sixth embodiment, only the main lobe is taken out and, after this is again diffracted/scattered, is collected by the detecting lens 14, and the light is incident on the photodetector 10 while being subjected to the aperture limitation by the fixed aperture 15, thus preventing the lowering of the amplitude of the reproduced signal.

Figure 11:
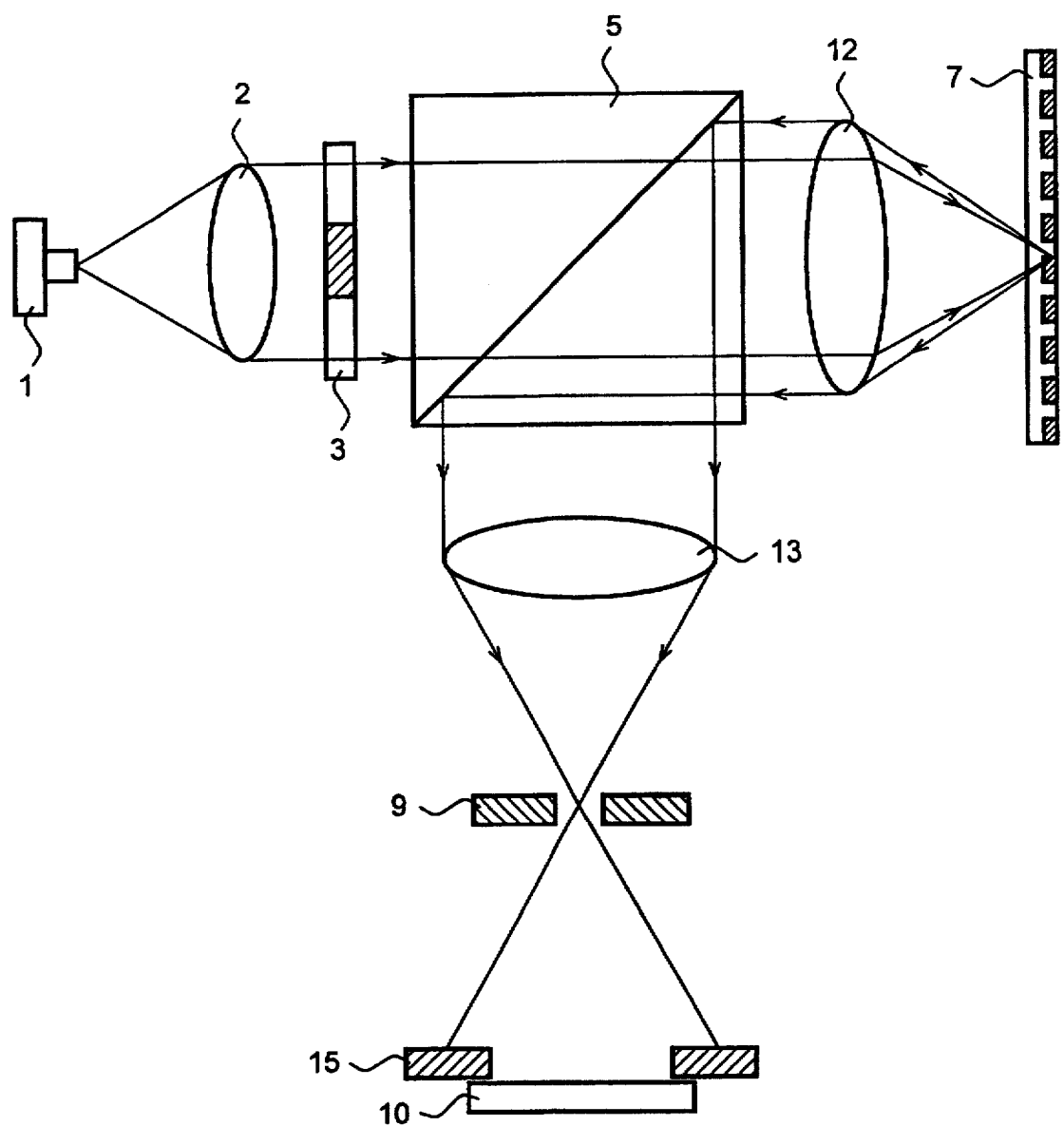
FIG. 11 is a diagram showing a system configuration of an optical system of a seventh embodiment according to the invention.

Next, a seventh embodiment according to the invention is explained. FIG. 11 shows a system configuration of an optical head device of the seventh embodiment. In the drawings, the same reference numerals are used for the same elements as in FIG. 9 and the same explanation is not repeated.

As shown in FIG. 11, in place of the detecting lens 14 in the fifth embodiment, the device of this seventh embodiment is provided with an aperture 15 and a photodetector 10, which are disposed directly in the scattered light that has passed through the pinhole 9. The device of this seventh embodiment produces the same advantageous effect as in the fifth and sixth embodiments.

Figure 12:
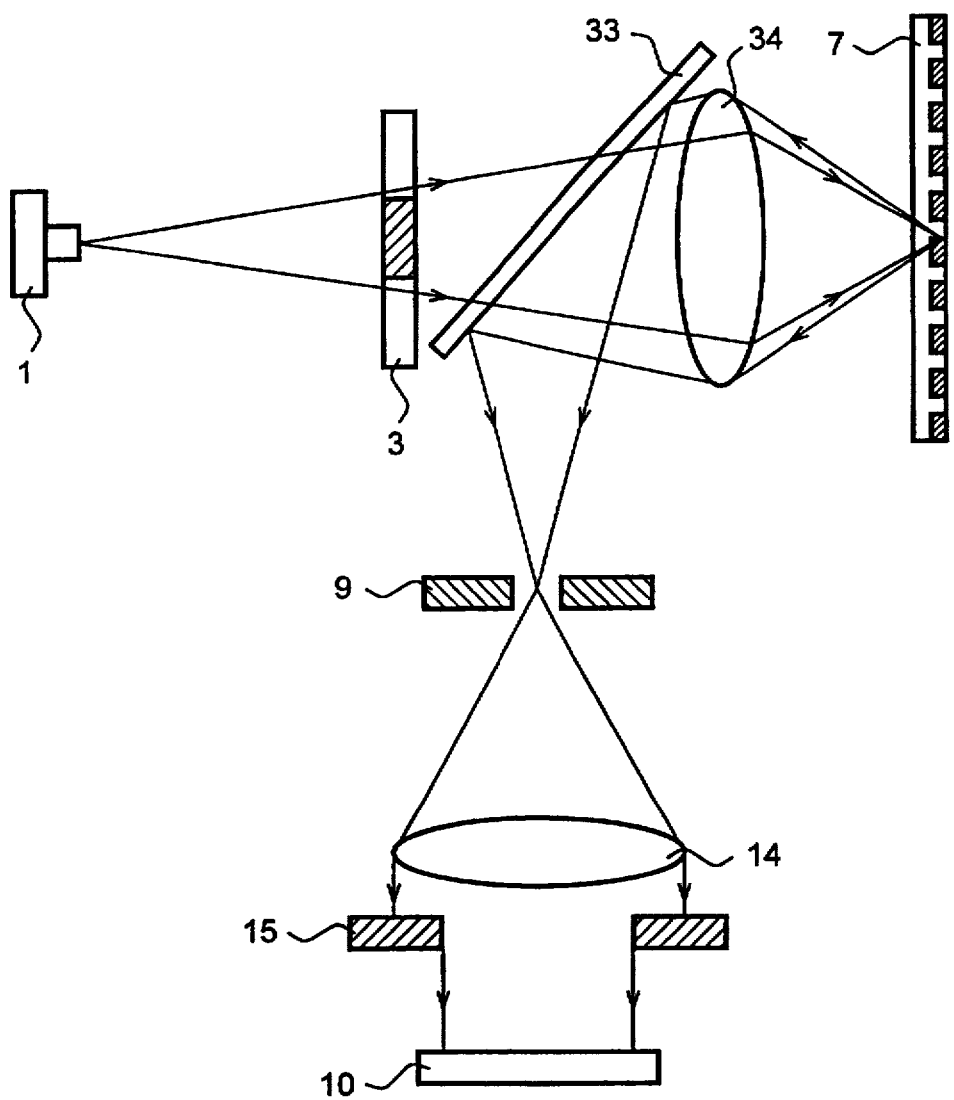
FIG. 12 is a diagram showing a system configuration of an optical system of an eighth embodiment according to the invention.

Next, the eighth embodiment of the invention is explained. FIG. 12 shows a system configuration of the device of the eighth embodiment. In the drawings, the same numerals are used for the same elements as in FIG. 9 without repeating the explanations. As seen in FIG. 12, in this eighth embodiment, no collimating lens 2 is used but an objective lens 34 of a finite type is used. It is possible to provide a further aperture in the light path between the light source 1 and the beamsplitter 33 so that the NA of the objective lens 12 may be made smaller during the light converging than that during the light collecting.

In this eighth embodiment, the laser light from the light source 1 is transmitted through the super-resolution filter 3, and the transmitted light is incident on the objective lens 34 and is then focussed and converged on the data recording medium 7 by the objective lens 34. The light reflected from the data recording medium 7 is incident on and reflected from the beamsplitter 33 through the objective lens 34 and, after the sidelobes having been removed by the pinhole 9 positioned at the location of the focal point, the light is scattered and incident on the detecting lens 14.

In this eighth embodiment, too, as in the other embodiments, the NA of the objective lens 34 is made larger during the light collecting than that during the light converging so that the sidelobes are removed by the pinhole 9 and there is no occurrence of the passing around of the sidelobes formed on the data recording medium 7. This enables the suppression of the deterioration of the reproduced signal and the prevention of the reduction of the amplitude of the reproduced signal.

It is to be noted that the invention is not limited to the embodiments explained above. Types of other available filters for use as the super-resolution filter 3 include a light intensity modulation type or a light phase modulation type that utilizes a light shielding plate or a phase plate for modulating the light or a prism for separating the path of light. The shapes of the light shielding plate or the phase plate include those of one dimensional as shown in FIG. 2A or two dimensional and, in the case of the two dimensional shape, the plate may be in a disk shape or in an annular shape. For the explanation of the embodiments, only the first order component of the sidelobes of the super-resolution spot are referred to, but it is to be understood that sidelobes of a higher dimensional order may also exist.

For the embodiments, the data recording medium 7 has been explained as being a recording medium such as a compact disk which has pits of a phase modulation type for recording the data as variations in undulations. However, without giving rise to the problem of reducing the amplitude of the reproduced signal, the invention may be applied to a phase change recording medium which has pits for modulating the light intensity and which records and reproduces the data as phase variations or to a magneto-optic recording medium with pits in which the tilting of a plane of polarization of the returning light is modulated by varying the magnetizing directions of the magnetic film, thereby enabling the suppression of the mixing of the sidelobes formed on the data recording medium into the position of the main lobe on the pinhole.

As explained above, since the NA of the objective lens for the light collecting from the data recording medium is made larger than that for the light converging thereon, and the high spatial frequency component of the spot on the data recording medium mostly passes through the objective lens before being incident on the reconverging optical system, it is possible to suppress the mixing of the sidelobe light on the data recording medium into the main lobe position on the pinhole. In this way, even when the data recording density becomes high, the deterioration of the reproduced signal can be greatly suppressed.

Also, according to this second aspect of the invention, only the main lobe in which the passing around of the sidelobes has been suppressed is taken out and, after this is again diffracted/scattered, is collected by the detecting lens and is caused to be incident on the photodetector while being subjected to the aperture limitation using a fixed aperture. Thus, it is possible to increase the variations in the quantity of light reflected from the data recording medium of a phase modulation type, thereby preventing the reduction in the amplitude of the reproduced signal.

Further, since the NA of the light converging objective lens is the same as that in the prior art, the effect of the expanding of beams caused by the tilting of the objective lens or the data recording medium is suppressed to the same extent as in the prior art.

Now, for the third aspect of the invention, ninth to twelfth embodiments are explained with reference to the drawings.

Compared with the prior art optical head device in which, since the data recording medium is of a reflection type, the objective lens is used for both the light converging and the light collecting, the device according to the present invention employs a data recording medium of a transmission type so that the optical head device is configured as the transmission type. Thus, in addition to the objective lens for the light converging, there is provided an objective lens for the light collecting whose NA is made larger than that of the objective lens for the light converging, and thus the mixing of the sidelobe light into the main lobe of the light reconverged on the photodetector is suppressed.

Figure 13:
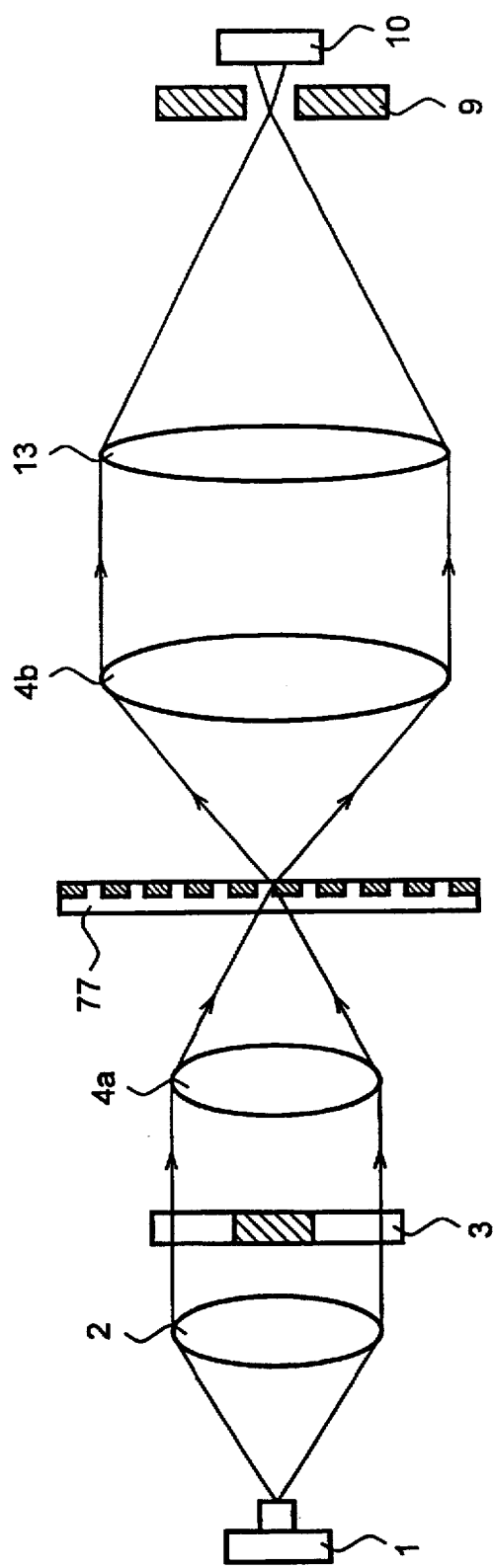
FIG. 13 is a diagram showing a system configuration of an optical system of a ninth embodiment according to the invention.

FIG. 13 is a system configuration of the optical head device of the ninth embodiment according to the invention.

As shown in FIG. 13, the light emitted from the light source 1 is made parallel by the collimating lens 2, it is modulated by the super-resolution filter 3 which produces a super-resolution spot, and it is then converged on the data recording medium 77. Because of the super-resolution effects, the diameter of the converged light spot becomes smaller as compared with that where the super-resolution filter 3 is not present, but there also occur sidelobes.

The light collecting objective lens 4b collects the light that is transmitted after being modulated by pits on the data recording medium 77, and makes the light parallel. The NA of the light collecting objective lens 4b is larger than that of the light converging objective lens 4a. The parallel light is converged by a reconverging lens 13, and only the light at a center portion is allowed to be transmitted through the pinhole 9 disposed at or near the focal position. The transmitted light is collected by the photodetector 10 and thus the data reproduced signal is obtained.

Also at this focal position, the converged light spot produces the sidelobes 58. Thus, the pinhole 9 is used to shade the sidelobes 58 and to allow only the main lobe 41 to pass through the pinhole 9.

Figure 14:
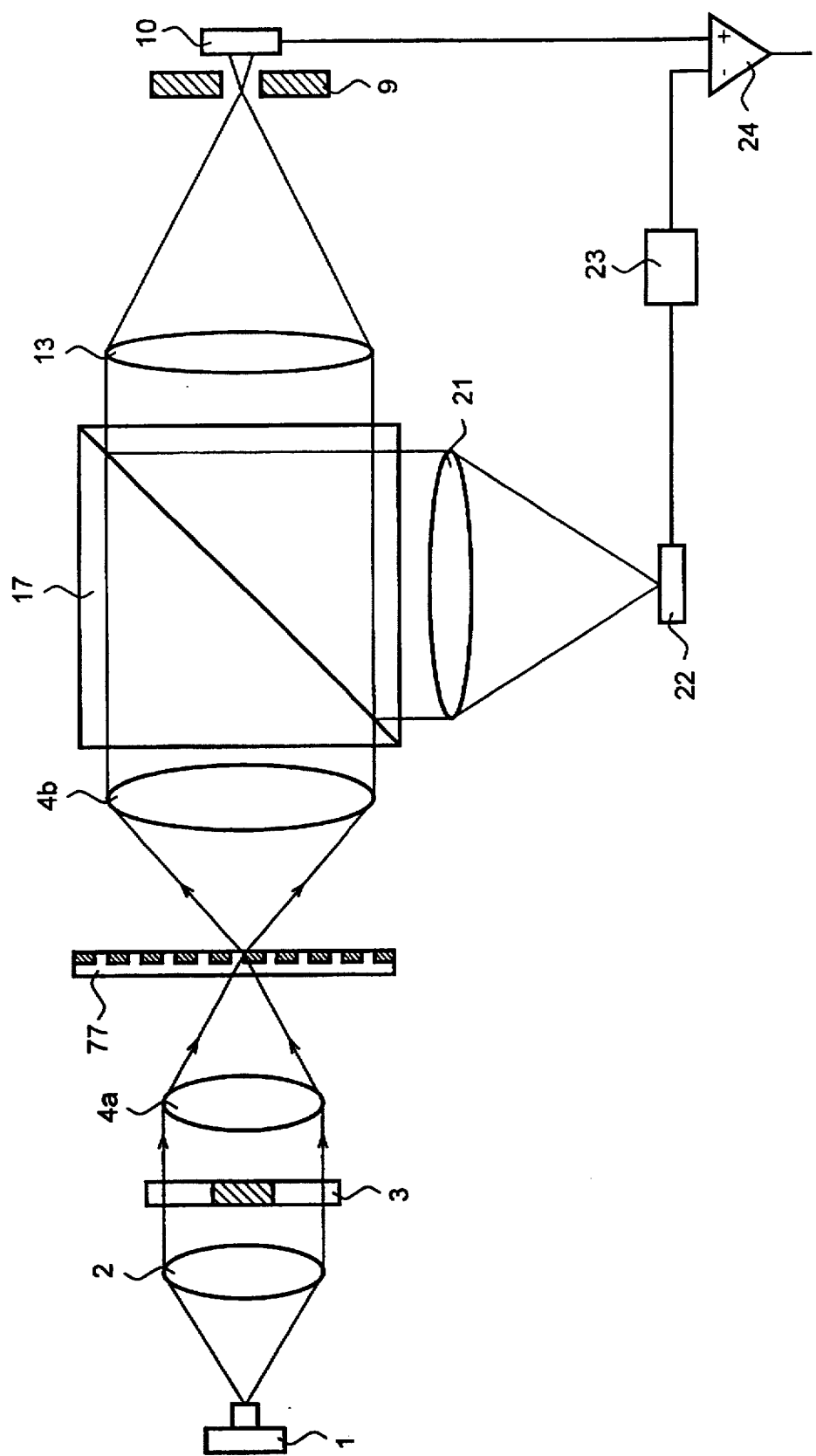
FIG. 14 is a diagram showing a system configuration of an optical system of a tenth embodiment according to the invention.

FIG. 14 shows a system configuration of an optical head device of the tenth embodiment according to the invention.

In this tenth embodiment, a structure with which to detect the reproduced signal using a differential signal between the sidelobe component and the main lobe component is added to the arrangement of the ninth embodiment explained above.

In the configuration shown in FIG. 14, the component of the sidelobe reflected by the pinhole 9 is reflected at the beamsplitter 17, is converged at the reconverging lens 21 and is collected by the photodetector 22. The signal collected by the photodetector 22 is attenuated by an attenuator 23, and the attenuated signal is inputted to a differential amplifier 24 together with the output signal collected by the photodetector 10, thereby providing a differential signal for the reproduced signal to be detected. In this way, the signal from the photodetector 10 is compensated by the signal from the compensating photodetector 22 so that the deterioration of the data reproduced signal is suppressed.

Figure 15:
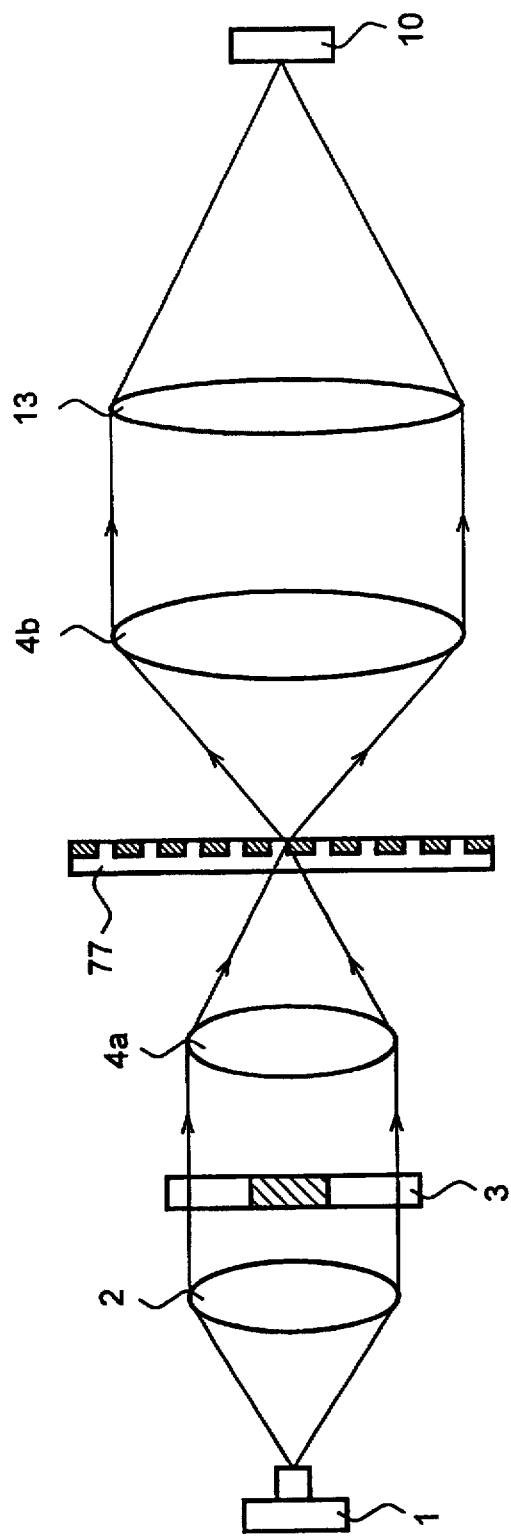
FIG. 15 is a diagram showing a system configuration of an optical system of a eleventh embodiment according to the invention.

FIG. 15 shows a system configuration of an optical head device of the eleventh embodiment according to the invention.

In this eleventh embodiment, in place of the pinhole 9 and the photodetector 10 used in the ninth embodiment, the device employs a three-division photodetector 40 for receiving the light. In this case, the signal from the sidelobe is attenuated and, by using a differential signal, it is possible to detect the reproducing signal and realize a high level signal detection.

Figure 16:
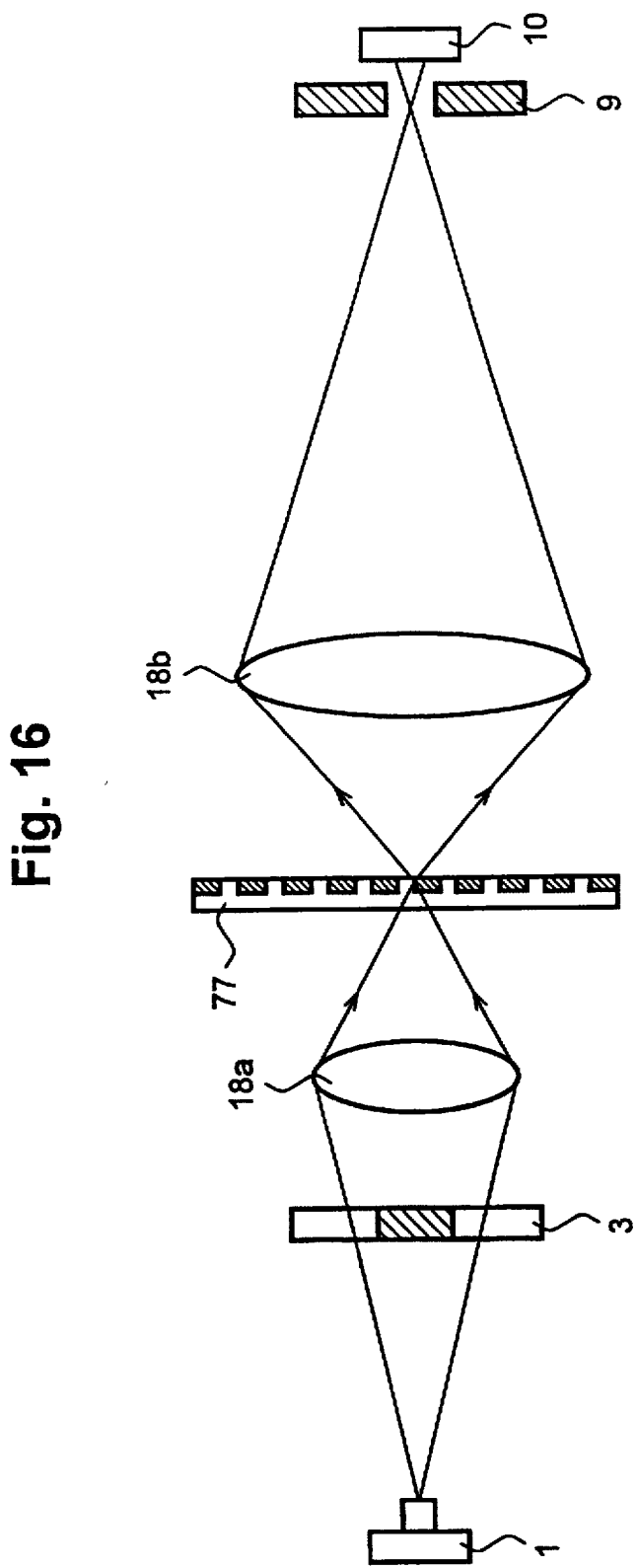
FIG. 16 is a diagram showing a system configuration of an optical system of a twelfth embodiment according to the invention.

FIG. 16 shows a system configuration of the twelfth embodiment according to the invention. This embodiment employs finite lenses 18a and 18b. In this case, an infinite lens as in the ninth embodiment may well be used.

While the invention has been described in its preferred embodiments, it is to be understood that the words which have been used are words of description rather than limitation and that changes within the purview of the appended claims may be made without departing from the true scope of the invention as defined by the claims.

For example, the super-resolution filter employed in the present application may either be a light intensity modulation type in which a light shading plate for shading the light or a prism for dividing the path of the light is used, or an optical phase modulation type in which a phase plate for modulating the light is used. The shape thereof may be that of any of one dimensional, or two dimensional such as circular or annular.

Also, although the embodiments refer only to the one component as the sidelobes of the super-resolution light spot, there can exist sidelobes of a higher order. The data recording medium may be that which uses pits for modulating phases, pits for modulating the light intensity, or pits for modulating the tilting of a polarizing surface of the light, which is realized in the form of, for example, a compact disk, or a phase change type recording/reproducing medium or an opto-magnetic medium.

According to the third aspect of the invention explained above, the NA of the light collecting system (4b) is made larger than that of the light converging system (4a) so that the deterioration of the data reproduced signal is suppressed to a minimum, and by making the difference in NA values between them larger, the rate of the mixing of the sidelobe light into the main lobe can be made smaller. Thus, in this way, it is possible to achieve a further suppression of the deterioration of the reproduced signal.

What is claimed is:

1. An optical head device comprising:

a light source for emitting laser light;

a super-resolution filter for providing a predetermined light intensity distribution with respect to a laser light from said light source; and a light converging and collecting means for converging the light on and collecting the light from a data recording medium, said light converging and collecting means having an numerical aperture larger for collecting the light from said recording medium than that for converging the light on said recording medium.

2. An optical head device comprising:

a light source for emitting laser light;

a super-resolution filter for providing a predetermined light intensity distribution on a data recording medium with respect to a laser light from said light source;

an objective lens for converging on a data recording medium the laser light that has passed through said super-resolution filter and for collecting the light from said data recording medium;

a reconverging lens means for reconverging the light that has been reflected from said data recording medium and has been transmitted through said objective lens;

a photo-detecting means for detecting a center portion of a flux of the light reconverged by said reconverging lens system; and said objective lens having a numerical aperture that is larger for collecting the light from said data recording medium than that for converging the light thereon.

3. The optical head device according to claim 2, in which said reconverging lens means comprises a beam-splitting means through which the laser light having passed through said super-resolution filter is incident on said objective lens and from which the light having passed through said objective lens is reflected to change its path of light, and a reconverging lens which reconverges the light having reflected from said beamsplitting means, and said photo-detecting means comprises a light pass limiting means which is located at a focal point of said reconverging lens and which allows a main lobe of the light reconverged by said reconverging lens system to pass, and a photo-detecting means for detecting the light that has passed through said light path limiting means.

4. The optical head device according to claim 3, in which said reconverging lens means comprises a beamsplitter through which the light reflected from said beamsplitting means is transmitted and then is incident on said reconverging lens and by which the light incident from said reconverging lens is reflected; an additional reconverging lens which reconverges the light reflected by said beamsplitter; an additional photodetector which detects the light converged by said additional reconverging lens; and a differential means which attenuates an output signal from said additional photo detector and takes a difference with respect to a detected signal from said photo-detecting means.

5. The optical head device according to claim 2, in which said photo-detecting means comprises a three-division photo detector which has light receiving surfaces for collecting a main lobe and sidelobes separately from each other out of the light reconverged by said reconverging lens means.

6. The optical head device according to claim 2, in which said objective lens is constituted by one of a finite lens system and an infinite lens system.

* * * * *